(12) United States Patent
Turk

(10) Patent No.: US 7,588,256 B1
(45) Date of Patent: Sep. 15, 2009

(54) STROLLER COUPLER

(76) Inventor: Michael T. Turk, 3218 Kendall Ave., Alton, IL (US) 62002

( * ) Notice: Subject to any disclaimer, the term of this patent is extended or adjusted under 35 U.S.C. 154(b) by 202 days.

(21) Appl. No.: 11/800,014

(22) Filed: May 3, 2007

Related U.S. Application Data

(60) Provisional application No. 60/800,485, filed on May 15, 2006.

(51) Int. Cl.
*B62B 7/12* (2006.01)

(52) U.S. Cl. .................. 280/47.38; 280/642; 280/650

(58) Field of Classification Search ............ 280/47.38, 280/47.35, 209, 33.992, 647, 642, 650, 204, 280/658, 47.23, 33.991; 297/58, 23, 248; 403/188, 389, 391
See application file for complete search history.

(56) References Cited

U.S. PATENT DOCUMENTS

| | | | | |
|---|---|---|---|---|
| 1,707,186 A | * | 3/1929 | Hall | ............................ 280/658 |
| 1,934,396 A | * | 11/1933 | Bales | ............................ 297/58 |
| 4,066,373 A | * | 1/1978 | Workman | .................... 403/391 |
| 5,529,427 A | * | 6/1996 | Bost | ............................ 403/391 |
| 6,155,592 A | * | 12/2000 | Hsia | ............................ 280/647 |
| 6,851,693 B2 | * | 2/2005 | Haeggberg | .................. 280/204 |
| 6,863,341 B1 | * | 3/2005 | Wen | ............................ 297/23 |
| 7,226,059 B1 | * | 6/2007 | Samuels | ................ 280/33.992 |

\* cited by examiner

*Primary Examiner*—Hau V Phan
(74) *Attorney, Agent, or Firm*—Philip L. Bateman

(57) ABSTRACT

A coupler is used with umbrella strollers having tubular frames and four wheel assemblies. The coupler connects two unfolded strollers in a side-by-side position with a sufficient distance between them to prevent any contact between the wheel assemblies of the strollers. The coupler contains a receptacle having a set of three resilient C-shaped clips extending outwardly from each side wall for connecting the coupler to the strollers.

20 Claims, 6 Drawing Sheets

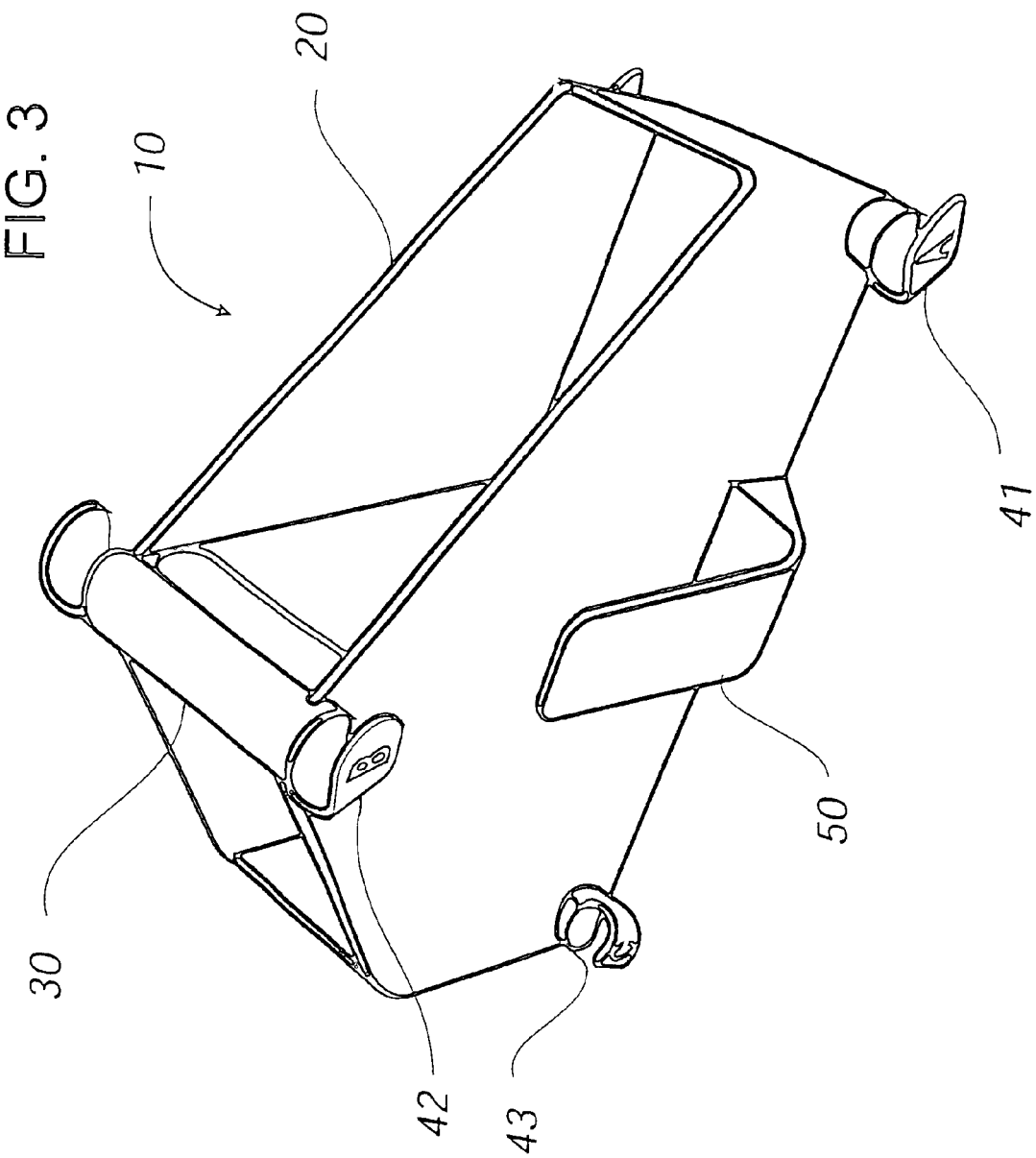

STROLLER COUPLER

CROSS-REFERENCE TO RELATED APPLICATION

This application claims the benefit of U.S. Provisional Application Ser. No. 60/800,485, May 15, 2006.

FIELD OF THE INVENTION

This invention relates to land vehicles. More particularly, this invention relates to strollers for infants.

BACKGROUND OF THE INVENTION

Strollers are widely used to transport infants. A stroller consists of a frame, a seat, four wheel assemblies, and a handle. The front two wheel assemblies typically rotate to enable the stroller to easily change direction and the rear two wheel assemblies are typically fixed to provide straight line stability. The most popular type of stroller contains a tubular frame with a scissor mechanism that enables the stroller to fold (or collapse) when not in use. This type of stroller is commonly known as an umbrella stroller because of the way it folds. Umbrella strollers are sold by many different companies.

A conventional umbrella stroller 100 is shown in two different positions in FIGS. 1 and 2. In FIG. 1, the stroller is shown in a partially unfolded position. In FIG. 2, the stroller is shown completely unfolded (its position when used to transport infants). The frame of the stroller includes a front down tube 101, a handle 102, and a rear down tube 103 on each side. A first pivoting connector 104 connects the top of front down tube with the bottom of a handle on each side. A second pivoting connector 105 connects the top of a rear down tube with the handle on each side. The frame also includes a horizontal scissor brace 106 that extends between connectors near the bottom of the front down tube and near the bottom of the rear down tube. The frame further includes a vertical scissor brace 107 that extends between connectors on the rear down tube and on the handle. The two scissor braces provide strength to the frame. They also lock the stroller in the unfolded position and prevent accidental folding when an infant is in the stroller. When the umbrella stroller is folded, the two scissor braces are unlocked, the two sides collapse toward each other, and the handles pivot forward onto the front down tubes.

As mentioned above, the final stage of the unfolding action of a conventional umbrella stroller is shown in FIGS. 1 and 2. In FIG. 1, the umbrella stroller is about eighty percent unfolded. At this point, the horizontal scissor brace extends a distance from back to front labeled as "X." In FIG. 2, the umbrella stroller is completely unfolded. The distance labeled "X" has decreased as the space between the sides has increased.

There are many circumstances when an adult must transport two infants in strollers. However, it is difficult to simultaneously control two separate strollers. Double strollers having two seats are available, but they are large and relatively expensive. Specialized convertible single/twin strollers have also been disclosed. Such strollers are disclosed in Brewington et al., U.S. Pat. No. 6,527,294, Mar. 4, 2003; and Wright, U.S. Pat. No. 6,752,405, Jun. 22, 2004. Unfortunately, neither of these two strollers is capable of use with a conventional umbrella stroller.

A variety of coupling devices have been disclosed to connect (or couple) two conventional umbrella strollers side-by-side so that a single person can control both. Coupling devices consisting of arms with connecting brackets on each end are disclosed in Redmond et al., U.S. Pat. No. 4,805,938, Feb. 21, 1989; Fraynd et al., U.S. Pat. No. 5,522,121, Jun. 4, 1996; Aaron et al., U.S. Pat. No. 5,918,892, Jul. 6, 1999; and DeTournay, U.S. Pat. Appln. Publn. No. US2002/0158444, Oct. 31, 2002. These devices suffer from the same shortcomings—the devices have no use when the strollers are folded, the devices have no storage compartments, time-consuming steps must be taken to connect the devices to a stroller, and the devices consist of two or more separate parts that must be used to connect two strollers.

Accordingly, there is a demand for a stroller coupler that is quickly and easily locked into place by the unfolding of the stroller, that has a storage compartment, and that is a single integral unit without parts that can get misplaced or lost, and that can also function as a carrier for two strollers when they are folded.

SUMMARY OF THE INVENTION

The general objects of this invention are to provide an improved stroller coupler and an improved method of connecting two strollers. A more particular object is to provide a stroller coupler that can couple two unfolded strollers and that can also function as a carrier for two folded strollers.

I have invented an improved coupler for two umbrella strollers, each of which strollers has a tubular frame with two sides, each of which sides has two wheel assemblies and a front down tube, a handle, and a rear down tube. The coupler comprises: (a) a receptacle having an open top, a bottom, a front wall, a rear wall, and two side walls, each side wall having a front, top, and rear, the distance between the side walls defining the width of the receptacle and being about two to ten inches; and (b) a set of three resilient C-shaped clips extending outwardly from each side wall, each set of clips adapted to frictionally fit onto the tubular frame of a stroller, a first clip at the front of each side wall adapted to fit onto the front down tube, a second clip at the top of each side wall adapted to fit onto the handle, and a third clip at the rear of each side wall adapted to fit onto the rear down tube; such that a connection of the coupler to two strollers places the strollers in a side-by-side position with a sufficient distance between them to prevent any contact between the wheel assemblies of the strollers. I have also invented a method of connecting two umbrella strollers by using the coupler.

The coupler of this invention couples two umbrella strollers in a side-by-side position when they are unfolded, is locked into place by the unfolding of the stroller, contains a storage compartment, and is a single integral unit without other parts that can be misplaced or lost. A preferred embodiment of the coupler also carries two strollers when they are folded

BRIEF DESCRIPTION OF THE DRAWINGS

FIG. 3 is a perspective view of a preferred embodiment of the stroller coupler-carrier of this invention.

DETAILED DESCRIPTION OF THE INVENTION

Figure 2:
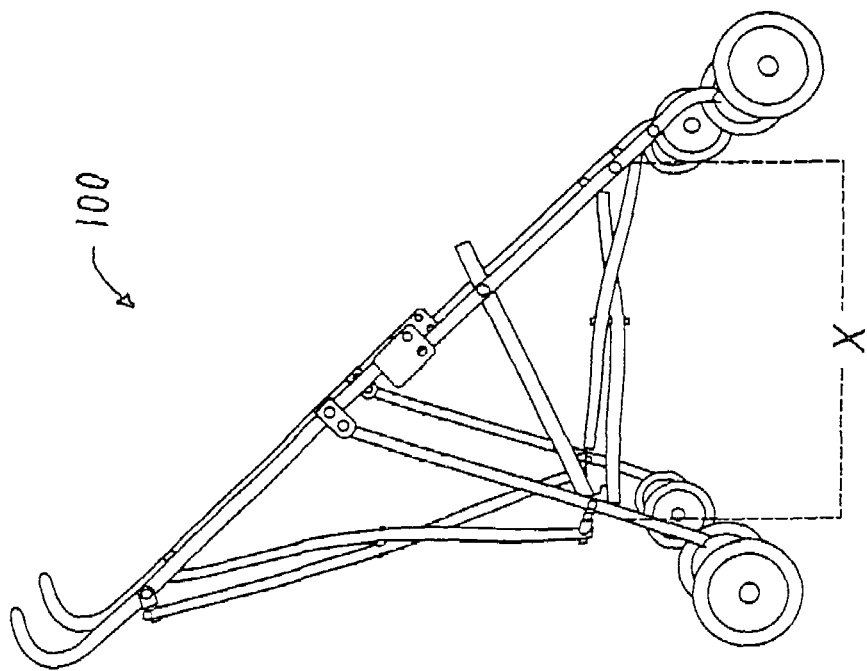
FIG. 2 is a side elevation view of a prior art stroller in a completely unfolded position.
Figure 1:
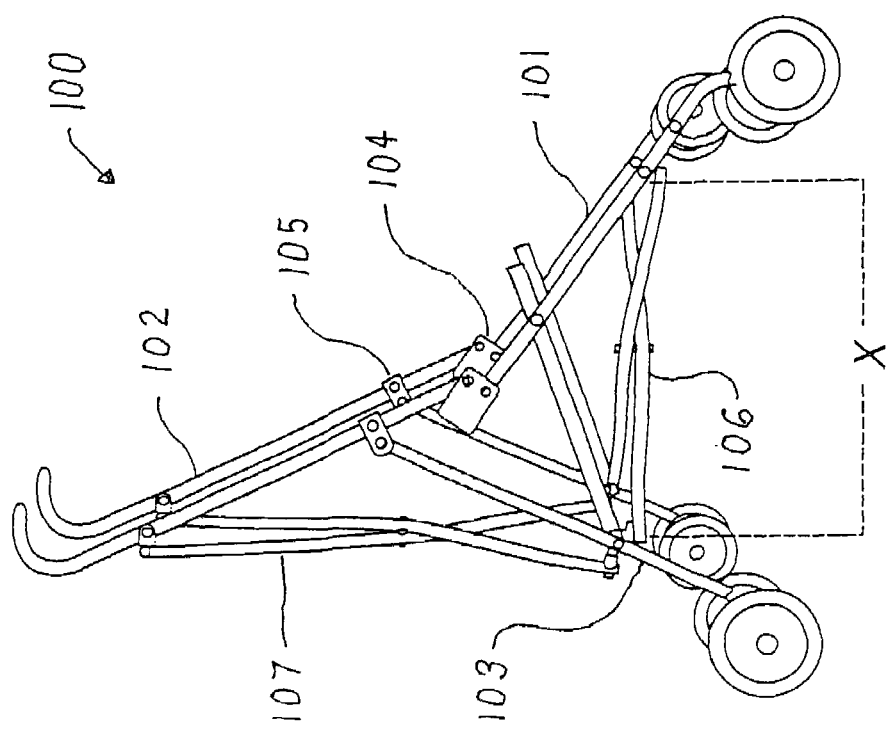
FIG. 1 is a side elevation view of a prior art stroller in a partially unfolded position.
Figure 5:
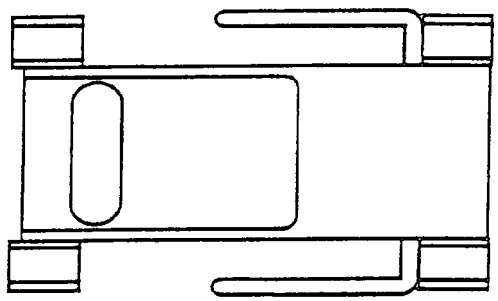
FIG. 5 is a front elevation view thereof.
Figure 4:
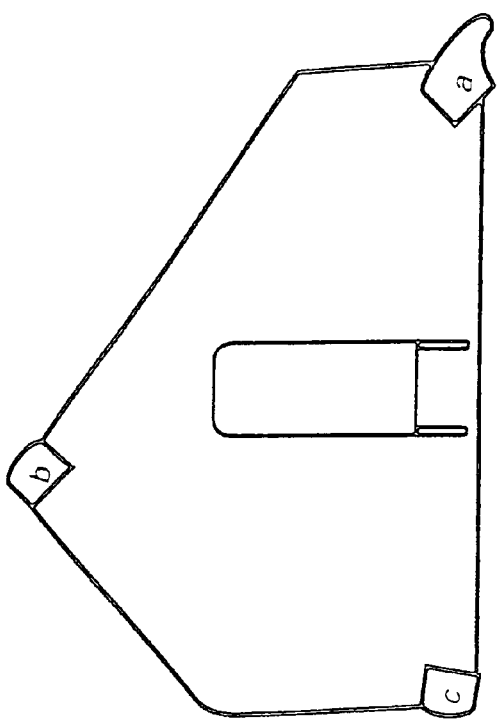
FIG. 4 is a side elevation view thereof.
Figure 6:
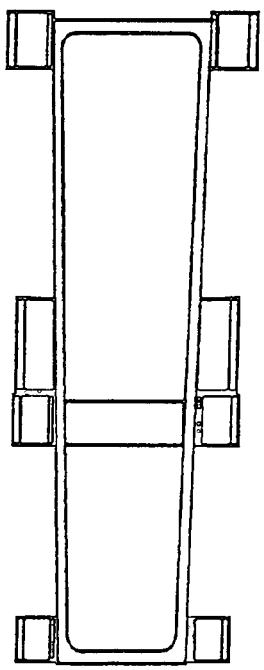
FIG. 6 is a top plan view thereof.

This invention is best understood by reference to the drawings. Referring to FIGS. 3 to 6, a preferred embodiment of the stroller coupler 10 of this invention comprises a receptacle 20, a handle 30, a set of three clips 40 on each side, and a hook 50 on each side. The coupler is adapted for use with two conventional umbrella (folding) strollers 100 having two wheel assemblies on each side and a tubular frame with a front down tube, a handle, and a rear down tube on each side. Each of these components is discussed in more detail below.

Figure 7:
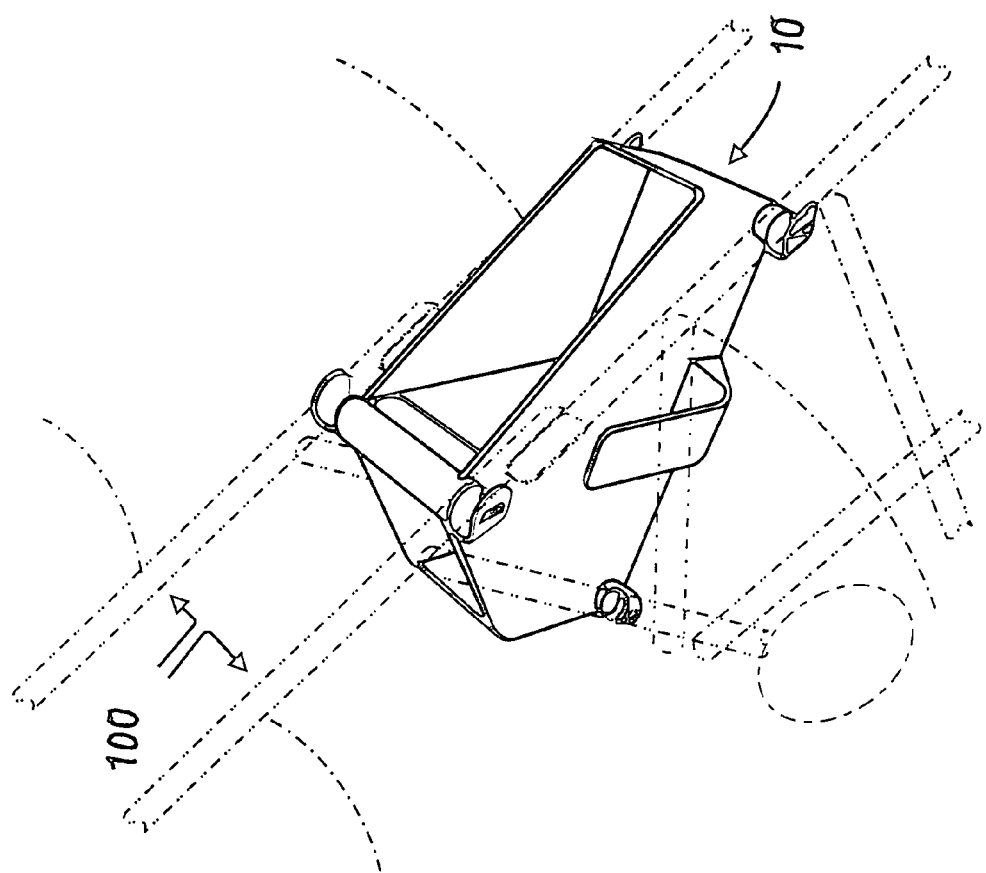
FIG. 7 is a perspective view of the coupler-carrier in use coupling two unfolded strollers that are shown in phantom lines.

The receptacle 20 serves several functions. It has one or more storage compartments, it separates the two strollers, and it serves as a frame to which the clips and hooks are attached. The receptacle has an open top, a bottom, a front wall, a rear wall, and two pentagonal (five-sided) side walls. The side walls angle upwardly from the front and rear to a peak to conform to the angle of the tubular frames of the strollers, as best seen in FIG. 7. The receptacle generally has a length (the distance between the front and rear walls) of about ten to sixteen inches, preferably about twelve to fourteen inches, and most preferably about thirteen inches. The receptacle generally has a height of about seven to thirteen inches, preferably about nine to eleven inches, and most preferably about ten inches. The receptacle generally has a width (the distance between the side walls) of about three to nine inches, preferably about five to seven inches. The receptacle most preferably has a width at the front of about six inches and a width at the rear of about five and one-half inches. Conventional strollers are slightly wider at the rear than at the front. A slight taper of the receptacle ensures that the strollers are parallel to each other.

The receptacle can be divided into two or more storage compartments by the addition of interior walls. Interior walls also provide additional rigidity to the receptacle. In the preferred embodiment, a single interior wall at the peak creates two separate compartments. The storage compartments are advantageously used to store infant supplies such as diapers, bottles, snacks, or the like. The receptacle is made of a durable, waterproof material. The preferred materials are plastics such as polypropylene, polystyrene, polyvinylchloride (PVC), acrylonitrile butadiene styrene (ABS), and the like. The receptacle is preferably manufactured by molding.

Figure 8:
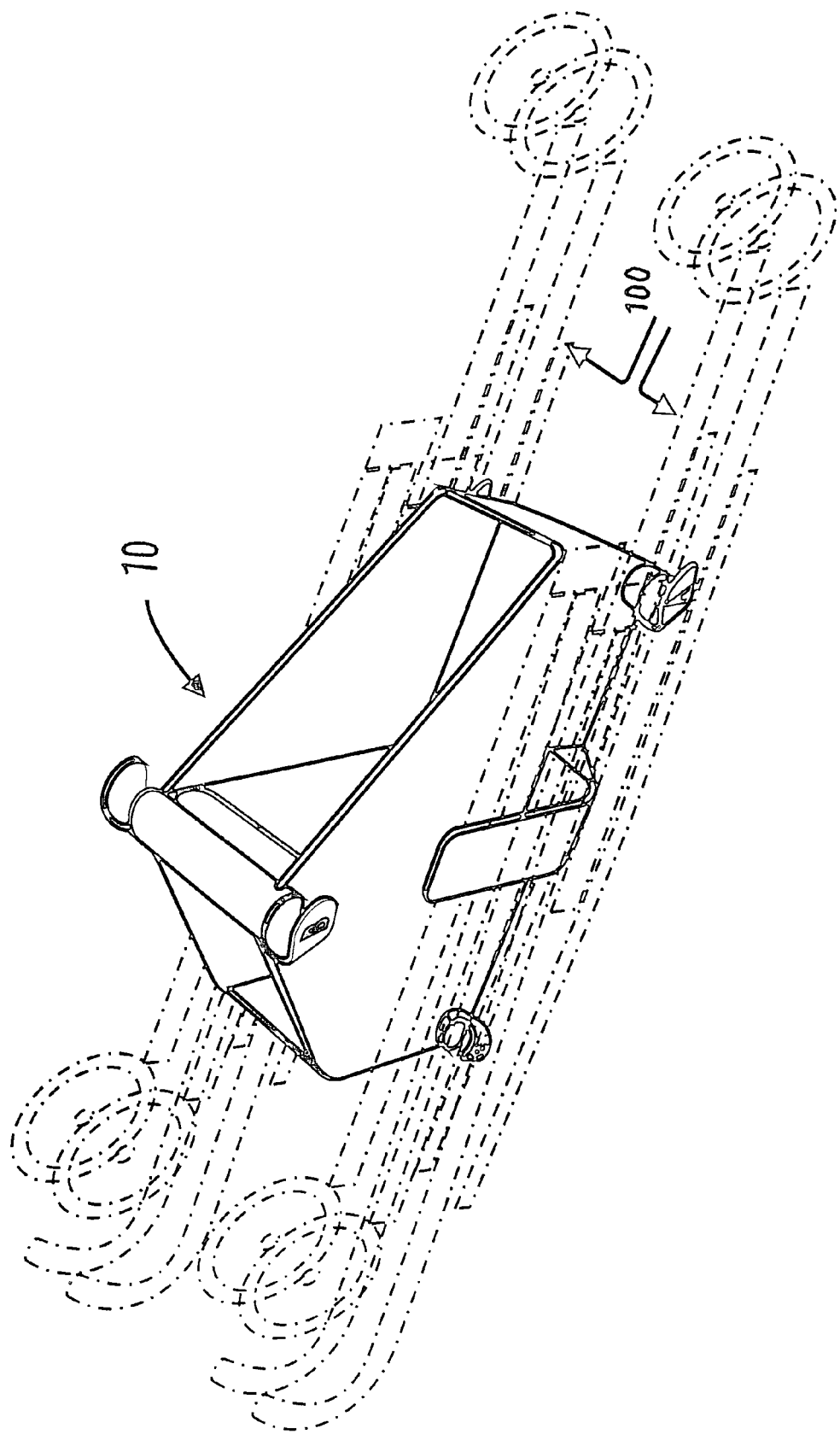
FIG. 8 is a perspective view of the coupler-carrier in use carrying two folded strollers that are shown in phantom lines.

The handle 30 of the preferred embodiment is used primarily for carrying the stroller coupler when it holds one or two folded strollers, as best seen in FIG. 8. The handle extends transversely between the tops of the side walls. The handle is preferably cylindrical with a diameter of about one to two inches to provide comfortable gripping. Although the handle is optional, it is highly preferred for convenience. 7

Each side of the receptacle contains three resilient C-shaped clips 40 extending outwardly. The clips are used to frictionally fit onto the tubular frame of a stroller adjacent the particular side. The first clip 41, designated clip "A," is located along the lower part of the side, near the front wall, and faces (opens) forward. The first clip engages the front down tube of the frame of the stroller. The second clip 42, designated clip "B," is located at the end of the handle and faces forward. The second clip engages the handle of the frame of the stroller. The third clip 43, designated clip "C," is located along the lower part of the side, near the rear wall, and faces backwards. The third clip engages the rear down tube of the frame of the stroller. The distance between clips "A" and "B" is most preferably about thirteen inches, the distance between clips "A" and "C" is most preferably about thirteen inches, and the distance between clips "B" and "C" is most preferably about eleven inches. The clips are preferably made of polypropylene because of its resilience. The clips are sized to engage a tubular member having a diameter of one-half inch. Most umbrella strollers are made with tubing of this diameter.

Each side of the receptacle of the preferred embodiment also contains a hook 50. The hook extends outwardly and upwardly from the near the bottom of the side wall. The hook defines a space into which a folded umbrella stroller can fit, as best seen in FIG. 8. The hooks are preferably made of polypropylene because of its resilience. Although the hooks are optional, they are highly preferred because they enable the coupler to be used as carrier for one or two folded strollers.

Figure 9:
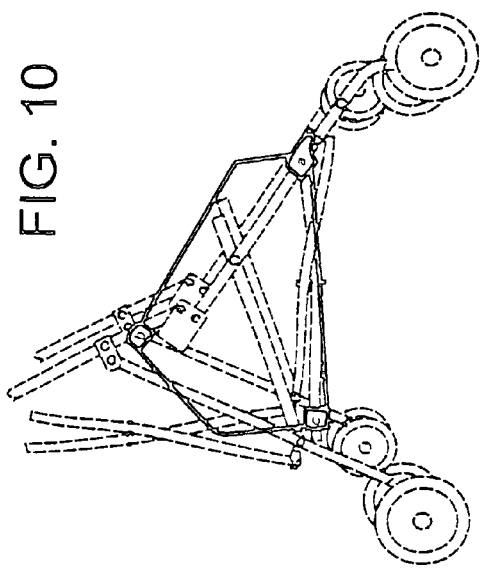
FIG. 9 is a side elevation view showing a first step in attaching the coupler-carrier to a stroller.
Figure 11:
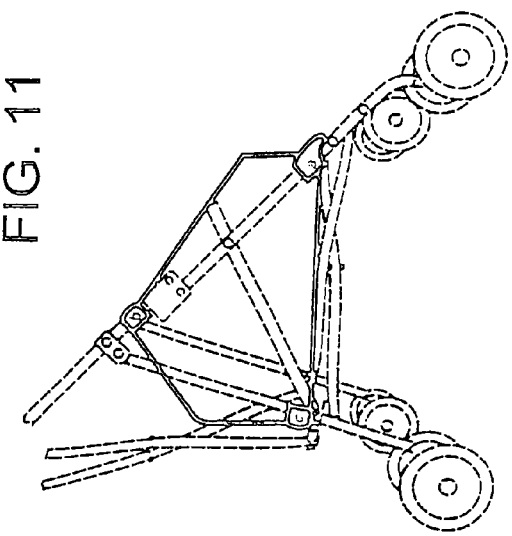
FIG. 11 is a side elevation view showing a third step in attaching the coupler-carrier to a stroller.
Figure 10:
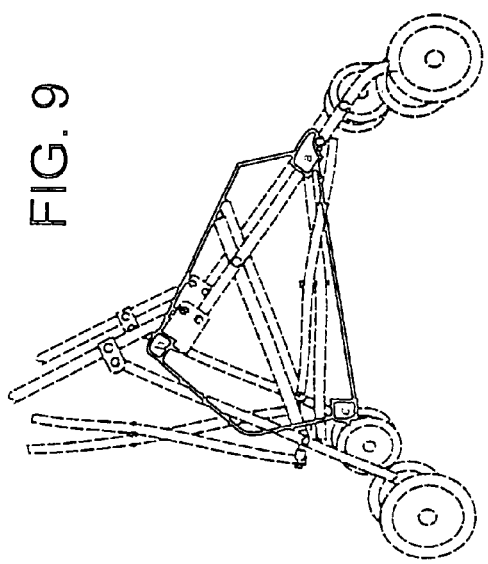
FIG. 10 is a side elevation view showing a second step in attaching the coupler-carrier to a stroller.

The use of the stroller coupler can now be considered. When it is desired to connect two umbrella strollers together, the three clips on each side of the coupler are fastened onto the tubular frame members of the strollers. The first step of the fastening process is to unfold one of the strollers about eighty percent. Referring to FIG. 9, the second step is to place the first clip "A" onto the front down tube just above the connector for the horizontal scissor brace. Still referring to FIG. 9, the third step is to place the second clip "B" onto the handle between the connectors for the rear down tube and the front down tube. Referring to FIG. 10, the fourth step is to completely unfold the stroller. The unfolding of the stroller automatically moves the rear down tube to the third clip "C." The third clip connects to the rear down tube just above the connector for the vertical scissor brace as shown in FIG. 11.

It can be appreciated that the locking of the stroller provided by the two scissor braces also serves to lock the coupler in place. The process is then repeated for the second stroller. It can also be appreciated that additional strollers can be connected by using additional couplers.

After fastening, the two (or more) strollers are locked together in a side-by-side orientation. The strollers are parallel and are spaced a sufficient distance apart so that their wheel assemblies do not interfere with the other stroller. One person can easily control the strollers when they are connected with the coupler.

To transport two strollers in the folded position, the clips are removed, the strollers are folded, and then two strollers are placed into the hooks as seen in FIG. 8. One person can easily grasp the handle and carry both the folded strollers.

I claim:

1. A coupler for two umbrella strollers, each of which strollers has a tubular frame with two sides, each of which sides has two wheel assemblies and a front down tube, a handle, and a rear down tube, the coupler comprising:

(a) a receptacle having an open top, a bottom, a front wall, a rear wall, and two side walls, each side wall having a front, top, and rear, the distance between the side walls defining the width of the receptacle and being about two to ten inches; and (b) a set of three resilient C-shaped clips extending outwardly from each side wall, each set of clips adapted to frictionally fit onto the tubular frame of a stroller, a first clip at the front of each side wall adapted to fit onto the front down tube, a second clip at the top of each side wall adapted to fit onto the handle, and a third clip at the rear of each side wall adapted to fit onto the rear down tube; such that a connection of the coupler to two strollers places the strollers in a side-by-side position with a sufficient distance between them to prevent any contact between the wheel assemblies of the strollers.

2. The coupler of claim 1 additionally comprising a handle extending transversely between the side walls.

3. The coupler of claim 2 additionally comprising a hook extending outwardly and upwardly from each side wall, each hook adapted to hold a collapsed stroller.

4. The coupler of claim 3 wherein the receptacle contains a plurality of compartments.

5. The coupler of claim 4 wherein the width of the receptacle is about four to eight inches.

6. The coupler of claim 5 wherein each side wall rises from the front and rear to form a peak.

7. The coupler of claim 6 wherein each side wall is pentagonal.

8. The coupler of claim 7 wherein the length of the receptacle is about ten to sixteen inches.

9. The coupler of claim 8 wherein the height of the receptacle is about ten to sixteen inches.

10. The coupler of claim 9 wherein the width of the receptacle tapers inwardly from front to rear.

11. A method of connecting two umbrella strollers in a side-by-side position, the method comprising:
   (a) obtaining two umbrella strollers, each of which strollers has a tubular frame with two sides, each of which sides has two wheel assemblies and a front down tube, a handle, and a rear down tube;
   (b) obtaining a coupler comprising: (i) a receptacle having an open top, a bottom, a front wall, a rear wall, and two side walls, each side wall having a front, top, and rear, the distance between the side walls defining the width of the receptacle and being about two to ten inches; and (ii) a set of three resilient C-shaped clips extending outwardly from each side wall, each set of clips adapted to frictionally fit onto the tubular frame of a stroller, a first clip at the front of each side wall adapted to fit onto the front down tube, a second clip at the top of each side wall adapted to fit onto the handle, and a third clip at the rear of each side wall adapted to fit onto the rear down tube;
   (c) connecting the coupler to one of the strollers; and
   (d) connecting the coupler to the other stroller.

12. The method of claim 11 wherein the coupler is connected to each stroller by placing the first clip on the front down tube and placing the second clip on the handle when the stroller is partially unfolded, and then completely unfolding the stroller to move the rear down tube into the third clip.

13. The method of claim 12 wherein the coupler additionally comprises a handle extending transversely between the side walls.

14. The method of claim 13 wherein the coupler additionally comprises a hook extending outwardly and upwardly from each side wall, each hook adapted to hold a collapsed stroller.

15. The method of claim 14 wherein the receptacle of the coupler contains a plurality of compartments.

16. The method of claim 15 wherein the width of the receptacle of the coupler is about four to eight inches.

17. The method of claim 16 wherein each side wall of the coupler rises from the front and rear to form a peak.

18. The method of claim 17 wherein each side wall of the coupler is pentagonal.

19. The method of claim 18 wherein the length of the receptacle of the coupler is about ten to sixteen inches and the height is about ten to sixteen inches.

20. The method of claim 19 wherein the width of the receptacle of the coupler tapers inwardly from front to rear.

* * * * *